(12) United States Patent
Bae et al.

(10) Patent No.: US 10,544,278 B2
(45) Date of Patent: *Jan. 28, 2020

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Seung Yong Bae, Uiwang-si (KR); Yoen Kyoung Kim, Uiwang-si (KR); Ju Sung Kim, Uiwang-si (KR); Kang Yeol Park, Uiwang-si (KR); Cheon Seok Yang, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 91 days.

This patent is subject to a terminal disclaimer.

(21) Appl. No.: 15/798,819

(22) Filed: Oct. 31, 2017

(65) Prior Publication Data

US 2018/0118914 A1 May 3, 2018

(30) Foreign Application Priority Data

Nov. 2, 2016 (KR) .................. 10-2016-0145153
Sep. 1, 2017 (KR) .................. 10-2017-0111807

(51) Int. Cl.
*C08K 3/22* (2006.01)

(52) U.S. Cl.
CPC ........ *C08K 3/22* (2013.01); *C08K 2003/2296* (2013.01); *C08K 2201/003* (2013.01); *C08K 2201/006* (2013.01)

(58) Field of Classification Search
CPC ..... C08K 3/22; C08K 2003/2296; C01G 9/03
See application file for complete search history.

(56) References Cited

U.S. PATENT DOCUMENTS

| | | | |
|---|---|---|---|
| 3,041,303 A | 6/1962 | Nelson | |
| 3,354,108 A | 11/1967 | Paradis et al. | |
| 4,331,786 A | 5/1982 | Foy et al. | |
| 4,356,300 A | 10/1982 | Isler et al. | |
| 4,612,340 A | 9/1986 | Ohachi | |
| 5,714,534 A | 2/1998 | Kojima et al. | |
| 5,714,545 A * | 2/1998 | Lee .................. | C08L 23/12 525/193 |
| 5,906,679 A | 5/1999 | Watanabe et al. | |
| 6,166,116 A | 12/2000 | Sleeckx | |
| 6,297,307 B1 | 10/2001 | Eichenauer et al. | |
| 6,663,877 B1 | 12/2003 | Appleton et al. | |
| 8,128,998 B2 | 3/2012 | Li et al. | |
| 2002/0106413 A1 | 8/2002 | Herbst et al. | |
| 2002/0109805 A1 | 8/2002 | Baba | |
| 2003/0125413 A1 | 7/2003 | Herbst et al. | |
| 2005/0043485 A1 | 2/2005 | Lee et al. | |
| 2005/0131100 A1 | 6/2005 | Herbst et al. | |
| 2007/0009691 A1 | 1/2007 | Barre et al. | |
| 2007/0049678 A1 | 3/2007 | Kim et al. | |
| 2010/0264383 A1 | 10/2010 | Tooley et al. | |
| 2014/0017335 A1 | 1/2014 | Dimov et al. | |
| 2016/0326670 A1 | 11/2016 | Kang et al. | |
| 2017/0198132 A1 | 7/2017 | Choi et al. | |
| 2018/0112056 A1 | 4/2018 | Yang et al. | |
| 2018/0118914 A1 | 5/2018 | Bae et al. | |
| 2018/0179314 A1 | 6/2018 | Kim et al. | |
| 2018/0179373 A1 | 6/2018 | Kim et al. | |
| 2018/0186989 A1 | 7/2018 | Lee et al. | |

FOREIGN PATENT DOCUMENTS

| | | |
|---|---|---|
| CN | 1710153 A1 | 12/2005 |
| CN | 1919542 A | 2/2007 |
| CN | 101001805 A | 7/2007 |
| CN | 101880426 A | 11/2010 |
| CN | 107974030 A | 5/2018 |
| EP | 1190622 A1 | 3/2002 |
| EP | 1510549 A1 | 3/2005 |
| EP | 3026082 A1 | 6/2016 |
| EP | 3326975 A1 | 5/2018 |
| EP | 3339367 A1 | 6/2018 |
| EP | 3339370 A1 | 6/2018 |
| FR | 1439417 A | 5/1966 |
| GB | 1040287 A | 8/1966 |
| JP | 55-133424 A | 10/1980 |
| JP | 56-045419 A | 4/1981 |
| JP | 08-253640 A | 10/1996 |

(Continued)

OTHER PUBLICATIONS

Extended Search Report in counterpart European Application No. 17199720.8 dated Mar. 7, 2018, pp. 1-7.
Search Report in commonly owned European Application No. 17210669.2 dated Apr. 20, 2018, pp. 1-5.
Office Action in commonly owned Korean Application No. 10-2016-0184170 dated Sep. 6, 2018, pp. 1-6.
Extended Search Report in commonly owned European Application No. 17209267.8 dated Mar. 26, 2018, pp. 1-7.
Office Action in commonly owned Korean Application No. 10-2016-0176575 dated Nov. 1, 2018, pp. 1-7.
Office Action in commonly owned Korean Application No. 10-2017-0075940 dated Aug. 21, 2017, pp. 1-8.
Extended Search Report in commonly owned European Application No. 17198304.2 dated Mar. 12, 2018, pp. 1-5.
Office Action in commonly owned Taiwanese Application No. 106136641 dated Aug. 17, 2018, pp. 1-6.
Office Action in commonly owned U.S. Appl. No. 15/790,334 dated Apr. 16, 2019, pp. 1-18.
Office Action in commonly owned Korean Application No. 10-2016-0177857 dated Nov. 20, 2018, pp. 1-8.

(Continued)

*Primary Examiner* — Brieann R Johnston
(74) *Attorney, Agent, or Firm* — Additon, Higgins & Pendleton, P.A.

(57) ABSTRACT

A thermoplastic resin composition and a molded article produced therefrom. The thermoplastic resin composition includes about 100 parts by weight of a thermoplastic resin and about 0.5 to about 30 parts by weight of zinc oxide. The zinc oxide has a peak intensity ratio (B/A) of about 0.01 to less than about 0.1, where A indicates a peak in the wavelength range of 370 nm to 390 nm and B indicates a peak in the wavelength range of 450 nm to 600 nm in photoluminescence measurement. The thermoplastic resin composition can exhibit good properties in terms of deodorization, impact resistance, and the like.

19 Claims, No Drawings

(56) References Cited

FOREIGN PATENT DOCUMENTS

| | | |
|---|---|---|
| JP | 10-182927 | 7/1998 |
| JP | H10195309 A | 7/1998 |
| JP | 10-251444 A | 9/1998 |
| JP | 11-035787 A | 2/1999 |
| JP | 2001-220486 A | 8/2001 |
| JP | 2006-182841 A | 7/2006 |
| JP | 2014-172783 A | 9/2014 |
| JP | 2014-221708 A | 11/2014 |
| JP | 2016-121273 A | 7/2016 |
| KR | 10-2002-0008203 A | 1/2002 |
| KR | 10-0696385 B1 | 3/2007 |
| KR | 10-2007-0047073 A | 5/2007 |
| KR | 10-2010-0087603 A | 8/2010 |
| KR | 10-1334283 B1 | 11/2013 |
| KR | 10-1452020 B1 | 10/2014 |
| KR | 10-2016-0083527 A | 7/2016 |

OTHER PUBLICATIONS

Extended Search Report in commonly owned European Application No. 17210117.2, dated Apr. 30, 2018, pp. 1-5.

Tsai, "The Influence on Intensity Ratio of Peak Emission between Recombination of Free-Excitons and Deep-Defect for ZnO Nanostructure Evolution from Nanorods to Nanotubes", Proceedings of the 16th International Conference on Nanotechnology, Sendai, Japan, Aug. 22-25, 2016, pp. 387-389.

Machine translated English language equivalent of CN 101880426 (2010, 5 pages).

Machine translated English language equivalent of JP 2014-221708 (2014, 9 pages).

Prasanna et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015).

Office Action in counterpart Korean Application No. 10-2017-0111807 dated Nov. 27, 2018, pp. 1-9.

Chandrakanth et al., "Synthesis and characterization of ZnO nanorods with a narrow size distribution", Royal Society of Chemistry, 2015, vol. 5, pp. 49861–49870 (17 pages).

Database WPI, Week 201654, Thomson Scientific, London, GB, Abstract of KR 2016-0083527 (Kolon Plastics Inc.), pp. 1-2.

Database WPI, Week 201463, Thomson Scientific, London, GB, Abstract of JP 2014-172783 (UBE Kagaku Kogyo KK), pp. 1-2.

Office Action in counterpart Chinese Application No. 201711062077.1 dated Jul. 12, 2019, pp. 1-7.

Office Action in commonly owned U.S. Appl. No. 15/845,020 dated Aug. 8, 2019, pp. 1-13.

Machine translated English language equivalent of JP Application No. H09-212736, which is the same as publication JP 11-035787 (1999, 10 pages).

Machine translated English language equivalent of CN 191542 (2007, 5 pages).

Office Action in commonly owned Chinese Application No. 201711007395.8 dated Jul. 31, 2019, pp. 1-6.

Office Action in commonly owned U.S. Appl. No. 15/844,980 dated Sep. 11, 2019, pp. 1-5.

Machine translated English language equivalent of H09-061580, which is the same as JP Publication JP 10-251444 (1998, 14 pages).

* cited by examiner

THERMOPLASTIC RESIN COMPOSITION AND ARTICLE PRODUCED THEREFROM

CROSS-REFERENCE TO RELATED APPLICATIONS

This application claims priority under 35 USC Section 119 to and the benefit of Korean Patent Application 10-2016-0145153, filed on Nov. 2, 2016, and Korean Patent Application 10-2017-0111807, filed on Sep. 1, 2017, the entire disclosure of each of which is incorporated herein by reference.

FIELD

The present invention relates to a thermoplastic resin composition and a molded article produced therefrom.

BACKGROUND

Thermoplastic resins have good properties in terms of impact resistance, processability, moldability, rigidity and appearance, and are widely used in various applications, such as automobiles, electric/electronic products, office equipment, home appliances, toys, and stationery.

Recently, with increasing concern about environmental problems, controversy regarding the hazards of thermoplastic resins is also increasing. Particularly, due to unreacted monomers remaining in a thermoplastic resin, there is a problem in that volatile organic compounds (VOCs) are released from the thermoplastic resin at high temperature. Such volatile organic compounds (VOCs) not only cause bad odors, but also have a negative influence on the human body upon long-term inhalation. Therefore, in recent years, attempts have been made to remove or minimize the volatile organic compounds (VOCs) generated from the thermoplastic resins.

Conventionally, in order to remove the volatile organic compounds (VOCs), a method of minimizing the content of residual monomers or oligomers through enhanced devolatilization during polymerization of raw materials or a method of enhancing water-washing through post treatment has been generally employed. However, these methods have problems such as decrease in output of polymer products and yellowing due to increased residence time during manufacturing processes. In addition, these methods have a problem of increase in process costs due to increase in the number of manufacturing processes and process time.

In addition, there has been proposed a method of adding a deodorant such as zeolite to allow residual monomers to be adsorbed thereon or a method of impregnating a thermoplastic resin with water to allow residual monomers to evaporate along with water through a vent during extrusion. However, the method of using a deodorant has a problem in that it is difficult to completely remove VOCs and residual VOCs are likely to be released during injection at high temperature. In addition, the method of impregnating a resin with water has a problem in that the inside of an extruder is likely to be corroded.

Therefore, there is a need for a thermoplastic resin composition which can reduce VOCs and can exhibit good deodorizing properties.

SUMMARY OF THE INVENTION

Exemplary embodiments provide a thermoplastic resin composition that can have good properties in terms of deodorization, impact resistance and the like, and a molded article formed therefrom.

The thermoplastic resin composition includes: about 100 parts by weight of a thermoplastic resin; and about 0.5 parts by weight to about 30 parts by weight of zinc oxide, wherein the zinc oxide has a peak intensity ratio (B/A) of about 0.01 to less than about 0.1, where A indicates a peak in the wavelength range of 370 nm to 390 nm and B indicates a peak in the wavelength range of 450 nm to 600 nm in photoluminescence measurement.

In exemplary embodiments, the zinc oxide may have a photocatalytic efficiency of about 90% to about 99%, as calculated by Equation 1:

$$\text{Photocatalytic efficiency } (\%) = \frac{N1 - N2}{N1} \times 100$$

where N1 denotes a UV absorbance of a 5 ppm methylene blue solution at a wavelength of 660 nm, and N2 denotes a UV absorbance of a 5 ppm methylene blue solution at a wavelength of 660 nm, as measured after 1,000 ppm of the zinc oxide is deposited in the methylene blue solution, followed by irradiation with UV-B in the wavelength range of 280 nm to 360 nm for 2 hours.

In exemplary embodiments, the zinc oxide may have a peak position degree (2θ) in the range of about 35° to about 37° and a crystallite size of about 1,000 Å to about 2,000 Å in analysis of X-ray diffraction (XRD), as calculated by Equation 2:

$$\text{Crystallite size } (D) = \frac{K\lambda}{\beta \cos\theta}$$

where K is a shape factor, λ is an X-ray wavelength, β is an FWHM value (degree) of an X-ray diffraction peak, and θ is a peak position degree.

In exemplary embodiments, the zinc oxide may have a peak intensity ratio (B/A) of about 0.01 to less than about 0.07 in photoluminescence measurement.

In exemplary embodiments, the zinc oxide may have an average particle diameter (D50) of about 0.5 μm to about 3 μm, as measured by a particle analyzer.

In exemplary embodiments, the zinc oxide may have an average particle diameter (D50) of about 1 μm to about 3 μm, as measured by a particle analyzer.

In exemplary embodiments, the zinc oxide may have a BET specific surface area of about 10 m²/g or less, as measured by a nitrogen gas adsorption method using a BET analyzer.

In exemplary embodiments, the zinc oxide may have a BET specific surface area of about 1 m²/g to about 7 m²/g, as measured by a nitrogen gas adsorption method using a BET analyzer.

In exemplary embodiments, the zinc oxide may be prepared by melting zinc particles in a reactor, heating the molten zinc to about 850° C. to about 1,000° C. to vaporize the molten zinc, injecting oxygen gas into the reactor, cooling the reactor to about 20° C. to about 30° C., heating the reactor to about 700° C. to about 800° C. for about 30 to 150 minutes while injecting nitrogen/hydrogen gas into the reactor, and cooling the reactor to about 20° C. to about 30° C.

In exemplary embodiments, the thermoplastic resin may include at least one of a rubber-modified vinyl-based copolymer resin, an aromatic vinyl resin, a polyolefin resin, a polycarbonate resin, a poly(alkyl (meth)acrylate) resin, a polyester resin, and a polyamide resin.

In exemplary embodiments, the rubber-modified vinyl-based copolymer resin may include a rubber-modified vinyl graft copolymer and an aromatic vinyl copolymer resin.

In exemplary embodiments, the rubber-modified vinyl graft copolymer may be prepared by graft polymerization of an aromatic vinyl monomer and a monomer copolymerizable with the aromatic vinyl monomer to a rubber polymer.

In exemplary embodiments, the aromatic vinyl copolymer resin may be a copolymer of an aromatic vinyl monomer and a monomer copolymerizable with the aromatic vinyl monomer.

In exemplary embodiments, the thermoplastic resin may be a rubber-modified vinyl-based copolymer resin, a polyolefin resin, and/or an aromatic vinyl resin.

In exemplary embodiments, the thermoplastic resin composition may have a total carbon emission ($E_G$) of about 20 µgC/g to about 40 µgC/g, as measured on a 2 g specimen in accordance with PV 3341 (Determination of emission of organic compounds).

In exemplary embodiments, the thermoplastic resin composition may have an Izod impact strength of about 4 kgf·cm/cm to about 30 kgf·cm/cm, as measured on an injection-molded ⅛" thick specimen in accordance with ASTM D256.

In exemplary embodiments, the thermoplastic resin may be a rubber-modified vinyl-based copolymer resin, and the thermoplastic resin composition may have an Izod impact strength of about 15 kgf·cm/cm to about 30 kgf·cm/cm, as measured on an injection-molded ⅛" thick specimen in accordance with ASTM D256.

In exemplary embodiments, the thermoplastic resin may be a polyolefin resin and may have an Izod impact strength of about 4 kgf·cm/cm to about 10 kgf·cm/cm, as measured on an injection-molded ⅛" thick specimen in accordance with ASTM D256.

In exemplary embodiments, the thermoplastic resin may be an aromatic vinyl resin and may have an Izod impact strength of about 7 kgf·cm/cm to about 15 kgf·cm/cm, as measured on an injection-molded ⅛" thick specimen in accordance with ASTM D256.

Other embodiments relate to a molded article. The molded article is formed of the thermoplastic resin as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

Hereinafter, embodiments of the present invention will be described in detail.

A thermoplastic resin composition according to the present invention includes: (A) a thermoplastic resin; and (B) zinc oxide.

(A) Thermoplastic Resin

In exemplary embodiments, the thermoplastic resin may be a thermoplastic resin used for a typical thermoplastic resin composition. Examples of the thermoplastic resin may include without limitation a rubber-modified vinyl-based copolymer resin, a polyolefin resin, an aromatic vinyl resin, a polycarbonate resin, a poly(alkyl (meth)acrylate) resin, a polyester resin, a polyamide resin, and the like, and combinations and/or mixtures thereof. For example, the thermoplastic resin may include (A1) a rubber-modified vinyl-based copolymer resin, (A2) a polyolefin resin, (A3) an aromatic vinyl resin, and/or a combination and/or a mixture thereof.

(A1) Rubber-Modified Vinyl-Based Copolymer Resin

According to exemplary embodiments, the rubber-modified vinyl-based copolymer resin may include (A1-1) a rubber-modified vinyl graft copolymer and (A1-2) an aromatic vinyl copolymer resin.

(A1-1) Rubber-Modified Vinyl Graft Copolymer

According to exemplary embodiments, the rubber-modified vinyl graft copolymer may be prepared by graft polymerization of an aromatic vinyl monomer and a monomer copolymerizable with the aromatic vinyl monomer to a rubber polymer.

In this embodiment, the rubber-modified vinyl graft copolymer may be prepared by adding the aromatic vinyl monomer and the monomer copolymerizable with the aromatic vinyl monomer to the rubber polymer, followed by polymerization. Here, the polymerization may be performed by any typical polymerization method known in the art, such as emulsion polymerization, suspension polymerization, and mass polymerization.

Examples of the rubber polymer may include diene rubbers such as polybutadiene, poly(styrene-butadiene), and/or poly(acrylonitrile-butadiene); saturated rubbers obtained by adding hydrogen to the diene rubbers; isoprene rubbers; acrylic rubbers such as poly(butyl acrylate); ethylene-propylene-diene monomer terpolymer (EPDM), and the like, without being limited thereto. These may be used alone or as a mixture thereof. For example, the rubber polymer may be a diene rubber, for example a butadiene rubber.

The rubber-modified vinyl graft copolymer can include rubber polymer in an amount of about 5% by weight (wt %) to about 65 wt %, for example, about 10 wt % to about 60 wt %, and as another example about 20 wt % to about 50 wt %, based on the total weight (100 wt %) of the rubber-modified vinyl graft copolymer. In some embodiments, the rubber-modified vinyl graft copolymer can include the rubber polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments, the amount of the rubber polymer can be in a range from about any of the foregoing amounts to about any other of the foregoing amounts.

Within this range, the thermoplastic resin composition can exhibit good properties in terms of impact resistance, mechanical properties, and the like.

The rubber polymer (rubber particles) may have an average (z-average) particle diameter of about 0.05 µm to about 6 µm, for example, about 0.15 µm to about 4 µm, and as another example about 0.25 µm to about 3.5 µm. Within this range, the thermoplastic resin composition can exhibit good properties in terms of impact resistance, appearance, flame retardancy, and the like. As used herein, the average (z-average) particle size can be measured by a dry method known in the art using a Mastersizer 2000E series tester (Malvern).

The aromatic vinyl monomer is graft-copolymerizable with the rubber copolymer and may include, for example, styrene, α-methylstyrene, β-methylstyrene, p-methylstyrene, p-t-butyl styrene, ethyl styrene, vinylxylene, monochlorostyrene, dichlorostyrene, dibromostyrene, vinyl naphthalene, and the like, without being limited thereto. These may be used alone or as a mixture thereof.

The rubber-modified vinyl graft copolymer can include the aromatic vinyl monomer in an amount of about 15 wt % to about 94 wt %, for example, about 20 wt % to about 80 wt %, and as another example about 30 wt % to about 60 wt %, based on the total weight (100 wt %) of the rubber-modified vinyl graft copolymer. In some embodiments, the rubber-modified vinyl graft copolymer can include the aromatic vinyl monomer in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, or 94 wt %. Further, according to some embodiments, the amount of the aromatic vinyl monomer can be in a range from about any of the foregoing amounts to about any other of the foregoing amounts.

Within this range, the thermoplastic resin composition can exhibit good properties in terms of fatigue resistance, impact resistance, mechanical properties, and the like.

Examples of the monomer copolymerizable with the aromatic vinyl monomer may include vinyl cyanide compounds, such as acrylonitrile, methacrylonitrile, ethacrylonitrile, phenylacrylonitrile, α-chloroacrylonitrile, and/or fumaronitrile, methacrylic acid and/or alkyl esters thereof, maleic anhydride, N-substituted maleimide, and the like, without being limited thereto. As used herein, the term "alkyl" refers to C1-C10 alkyl. These may be used alone or as a mixture thereof. In exemplary embodiments, the monomer copolymerizable with the aromatic vinyl monomer may be acrylonitrile, methyl(meth)acrylate, or a combination thereof.

The rubber-modified vinyl graft copolymer can include the monomer copolymerizable with the aromatic vinyl monomer in an amount of about 1 wt % to about 50 wt %, for example, about 5 wt % to about 45 wt %, and as another amount about 10 wt % to about 30 wt %, based on the total weight (100 wt %) of the rubber-modified vinyl graft copolymer. In some embodiments, the rubber-modified vinyl graft copolymer can include the monomer copolymerizable with the aromatic vinyl monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can exhibit good properties in terms of impact resistance, flowability, appearance, and the like.

Examples of the rubber-modified vinyl graft copolymer may include acrylonitrile-butadiene-styrene graft copolymer (g-ABS) in which a styrene monomer as the aromatic vinyl compound and an acrylonitrile monomer as the vinyl cyanide compound are grafted to a butadiene rubber polymer, and methyl methacrylate-butadiene-styrene graft copolymer (g-MBS) in which a styrene monomer as the aromatic vinyl compound and methyl methacrylate as the monomer copolymerizable with the aromatic vinyl compound are grafted to a butadiene rubber polymer, without being limited thereto.

In exemplary embodiments, the rubber-modified vinyl-based copolymer resin (A1) can include the rubber-modified vinyl graft copolymer (A1-1) in an amount of about 10 wt % to about 40 wt %, for example, about 15 wt % to about 30 wt %, based on the total weight (100 wt %) of the rubber-modified vinyl-based copolymer resin (A1). In some embodiments, the rubber-modified vinyl-based copolymer resin (A1) can include the rubber-modified vinyl graft copolymer (A1-1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments, the amount of the rubber-modified vinyl graft copolymer can be in a range from about any of the foregoing amounts to about any other of the foregoing amounts.

Within this range, the thermoplastic resin composition can exhibit good properties in terms of impact resistance, flowability (moldability), and the like.

(A1-2) Aromatic Vinyl Copolymer Resin

According to exemplary embodiments, the aromatic vinyl copolymer resin may be an aromatic vinyl copolymer resin used in a typical rubber-modified vinyl-based copolymer resin. For example, the aromatic vinyl copolymer resin may be a copolymer of a monomer mixture including an aromatic vinyl monomer and a monomer copolymerizable with the aromatic vinyl monomer, such as a vinyl cyanide monomer.

In exemplary embodiments, the aromatic vinyl copolymer resin may be prepared by mixing the aromatic vinyl monomer and the monomer copolymerizable with the aromatic vinyl monomer, followed by polymerization of the mixture. Here, the polymerization may be performed by any typical polymerization method known in the art, such as emulsion polymerization, suspension polymerization, and mass polymerization.

In exemplary embodiments, the aromatic vinyl monomer may include styrene, α-methylstyrene, β-methyl styrene, p-methyl styrene, p-t-butyl styrene, ethyl styrene, vinylxylene, monochlorostyrene, dichlorostyrene, dibromostyrene, vinyl naphthalene, and the like, without being limited thereto. These may be used alone or as a mixture thereof.

The aromatic vinyl copolymer resin can include aromatic vinyl monomer in an amount of about 20 wt % to about 90 wt %, for example, about 30 wt % to about 80 wt %, based on the total weight (100 wt %) of the aromatic vinyl copolymer resin. In some embodiments, the aromatic vinyl copolymer resin can include aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl monomer can be in a range from about any of the foregoing amounts to about any other of the foregoing amounts.

Within this range, the thermoplastic resin composition can exhibit good properties in terms of impact resistance, flowability, and the like.

Examples of the monomer copolymerizable with the aromatic vinyl monomer may include vinyl cyanide compounds, such as acrylonitrile, methacrylonitrile, ethacrylonitrile, phenylacrylonitrile, α-chloroacrylonitrile, and/or fumaronitrile, (meth)acrylic acid and/or alkyl esters thereof, maleic anhydride, N-substituted maleimide, and the like, without being limited thereto. As used herein, the term "alkyl" refers to C1-C10 alkyl. These may be used alone or as a mixture thereof.

The aromatic vinyl copolymer resin can include the monomer copolymerizable with the aromatic vinyl monomer in an amount of about 10 wt % to about 80 wt %, for example, about 20 wt % to about 70 wt %, based on the total weight (100 wt %) of the aromatic vinyl copolymer resin. In some embodiments, the aromatic vinyl copolymer resin can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the monomer copolymerizable with the aromatic vinyl monomer can be in a range from about any of the foregoing amounts to about any other of the foregoing amounts.

Within this range, the thermoplastic resin composition can exhibit good properties in terms of impact resistance, flowability, and the like.

In exemplary embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can exhibit good properties in terms of mechanical properties, moldability, and the like.

In exemplary embodiments, the rubber-modified vinyl-based copolymer resin (A1) can include the aromatic vinyl copolymer resin (A1-2) in an amount of about 60 wt % to about 90 wt %, for example, about 70 wt % to about 85 wt %, based on the total weight (100 wt %) of the rubber-modified vinyl-based copolymer resin (A1). In some embodiments, the rubber-modified vinyl-based copolymer resin (A1) can include the aromatic vinyl copolymer resin (A1-2) in an amount of 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments, the amount of the aromatic vinyl copolymer resin can be in a range from about any of the foregoing amounts to about any other of the foregoing amounts.

Within this range, the thermoplastic resin composition can exhibit good properties in terms of impact resistance, flowability (moldability), and the like.

(A2) Polyolefin Resin

According to exemplary embodiments, the polyolefin resin may be a typical polyolefin resin. Examples of the polyolefin resin may include without limitation polyethylene-based resins such as low density polyethylene (LDPE), medium density polyethylene (MDPE), high density polyethylene (HDPE), linear low density polyethylene (LLDPE), ethylene-vinyl acetate (EVA) copolymer, ethylene-acrylate copolymer, and the like, and mixtures thereof; polypropylene-based resins such as polypropylene, propylene-ethylene copolymer, propylene-1-butene copolymer, and the like, and mixtures thereof; polymers obtained by crosslinking the same; a blend containing polyisobutene; and the like; and mixtures thereof. For example, a polypropylene resin may be used as the polyolefin resin.

In exemplary embodiments, the polyolefin resin may have a weight average molecular weight (Mw) of about 10,000 g/mol to about 400,000 g/mol, for example, about 15,000 to about 350,000 g/mol, as measured by gel permeation chromatography (GPC). Within this range, the thermoplastic resin composition can exhibit good properties in terms of mechanical strength, moldability, and the like.

(A3) Aromatic Vinyl Resin

According to one embodiment, the aromatic vinyl resin may be a typical aromatic vinyl resin. For example, the aromatic vinyl resin may include polystyrene (PS), high impact polystyrene (HIPS), styrene-acrylonitrile copolymer resin (SAN), and the like. These may be used alone or as a mixture thereof. The aromatic vinyl resin may be prepared by a typical method known to those skilled in the art or may be obtained from commercially available products.

In exemplary embodiments, the aromatic vinyl resin may have a weight average molecular weight (Mw) of about 10,000 g/mol to about 300,000 g/mol, for example, about 15,000 to about 250,000 g/mol, as measured by gel permeation chromatography (GPC). Within this range, the thermoplastic resin composition can exhibit good properties in terms of mechanical strength, moldability, and the like.

(B) Zinc Oxide

According to the present invention, the zinc oxide serves to improve deodorizing properties of the thermoplastic resin composition, and may have a peak intensity ratio (B/A) of about 0.01 to less than about 0.1, for example, about 0.01 to about 0.09, as another example about 0.01 to about 0.08, and as another example about 0.01 to less than about 0.07, where A indicates a peak in the wavelength range of 370 nm to 390 nm and B indicates a peak in the wavelength range of 450 nm to 600 nm in photoluminescence measurement. In some embodiments, the zinc oxide may have a peak intensity ratio (B/A) of about 0.01, 0.02, 0.03, 0.04, 0.05, 0.06, 0.07, 0.08, or 0.09. If the peak intensity ratio (B/A) of the zinc oxide is outside this range, the thermoplastic resin composition can have poor deodorizing properties.

In exemplary embodiments, the zinc oxide may have a photocatalytic efficiency of about 90% to about 99%, for example, about 91% to about 98.5%, as calculated according to Equation 1. Within this range, the thermoplastic resin composition can have good deodorizing properties.

$$\text{Photocatalytic efficiency (\%)} = \frac{N1 - N2}{N1} \times 100 \quad \langle \text{Equation 1} \rangle$$

where N1 denotes a UV absorbance of a 5 ppm methylene blue solution at a wavelength of 660 nm, and N2 denotes a UV absorbance of a 5 ppm methylene blue solution at a wavelength of 660 nm, as measured after 1,000 ppm of the zinc oxide is deposited in the methylene blue solution, followed by irradiation with UV-B in the wavelength range of 280 nm to 360 nm for 2 hours.

In exemplary embodiments, the zinc oxide may have a peak position degree (2θ) in the range of about 35° to about 37° and a crystallite size of about 1,000 Å to about 2,000 Å, for example, about 1,200 Å to about 1,800 Å in X-ray diffraction (XRD) analysis, as calculated by Scherrer's Equation (Equation 2) with reference to a measured FWHM value (full width at half maximum of a diffraction peak). Within this range, the thermoplastic resin composition can exhibit good properties in terms of initial color, mechanical properties, and the like.

$$\text{Crystallite size } (D) = \frac{K\lambda}{\beta \cos \theta} \quad \langle \text{Equation 2} \rangle$$

where K is a shape factor, λ is an X-ray wavelength, β is an FWHM value (degree) of an X-ray diffraction peak, and θ is a peak position degree.

In exemplary embodiments, the zinc oxide may have various shapes, for example, a spherical shape, a plate shape, a rod shape, and combinations thereof. Further, the zinc oxide may have an average particle diameter (D50) of about 0.5 μm to about 3 μm, for example, about 1 μm to about 3 μm, as measured in a single particle state (not forming a secondary particle through agglomeration of particles) using a particle analyzer (Laser Diffraction Particle Size Analyzer LS I3 320, Beckman Coulter Co., Ltd.). In some embodiments, the zinc oxide may have an average particle diameter (D50) of about 0.5, 0.6, 0.7, 0.8, 0.9, 1, 2, or 3 μm. Within this range of particle size, the thermoplastic resin composition can exhibit good properties in terms of discoloration resistance, weather resistance, and the like.

In exemplary embodiments, the zinc oxide may have a BET specific surface area of about 10 m$^2$/g or less, for example, about 1 m$^2$/g to about 7 m$^2$/g, as measured by a nitrogen gas adsorption method using a BET analyzer (Surface Area and Porosity Analyzer ASAP 2020, Micromeritics Co., Ltd.), and a purity of about 99% or more. Within this range, the thermoplastic resin composition can exhibit good properties in terms of mechanical properties, discoloration resistance, and the like.

In exemplary embodiments, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, and cooling the reactor to room temperature (about 20° C. to about 30° C.).

In exemplary embodiments, the thermoplastic resin composition may include the zinc oxide in an amount of about 0.5 parts by weight to about 30 parts by weight, for example, about 0.5 parts by weight to about 20 parts by weight, and as another example about 1 part by weight to about 10 parts by weight, relative to about 100 parts by weight of the thermoplastic resin. In some embodiments, the thermoplastic resin composition can include the zinc oxide in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments, the amount of the zinc oxide can be in a range from about any of the foregoing amounts to about any other of the foregoing amounts.

If the zinc oxide is present in an amount of less than about 0.5 parts by weight relative to about 100 parts by weight of the thermoplastic resin, the thermoplastic resin composition can have poor deodorizing properties, and if the zinc oxide is present in an amount of larger than about 30 parts by weight, the thermoplastic resin composition can have poor mechanical properties.

According to exemplary embodiments, the thermoplastic resin composition may further include one or more optional additives, which are included in a typical thermoplastic resin composition. Examples of the additives may include flame retardants, fillers, antioxidants, anti-dripping agents, lubricants, release agents, nucleating agents, antistatic agents, stabilizers, pigments, dyes, and the like, and combinations and/or mixtures thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition may be prepared in pellet form by mixing the aforementioned components, followed by melt extrusion using a typical twin-screw extruder at about 200° C. to about 280° C., for example, about 220° C. to about 250° C.

In exemplary embodiments, the thermoplastic resin composition may have a total carbon emission ($E_G$) of about 20 μgC/g to about 40 μgC/g (μg carbon per g of sample), for example, about 22 μgC/g to about 38 μgC/g, as measured on a 2 g specimen in accordance with Volkswagen PV 3341 Non-Metallic Materials in Automotive Interior Trim (Determination of emission of organic compounds). In some embodiments, the thermoplastic resin composition may have a total carbon emission ($E_G$) of about 20, 21, 22, 23, 24, 25, 26, 27, 28, 29, 30, 31, 32, 33, 34, 35, 36, 37, 38, 39, or 40 μgC/g. Within this range, the thermoplastic resin composition can have good deodorizing properties.

In exemplary embodiments, for example when the thermoplastic resin includes a rubber-modified vinyl-based copolymer resin, the thermoplastic resin composition may include about 40 ppm to about 80 ppm, for example, about 50 ppm to about 70 ppm, of a vinyl cyanide monomer and 470 ppm to about 630 ppm, for example, about 480 ppm to about 620 ppm, of an aromatic vinyl monomer, as measured by gas chromatography (GC) (HP-6890, Agilent Technologies) for determining residual volatile compounds under conditions specified in the following EXAMPLE. In addition, for example when the thermoplastic resin includes an aromatic vinyl resin, the thermoplastic resin composition may include 290 ppm to about 410 ppm, for example, about 300 ppm to about 405 ppm, of an aromatic vinyl monomer, as measured by gas chromatography (GC) (HP-6890, Agilent Technologies) for determining residual volatile compounds under conditions specified in the following EXAMPLE.

In exemplary embodiments, the thermoplastic resin composition may have an Izod impact strength of about 4 kgf·cm/cm to about 30 kgf·cm/cm, for example, about 4.2 kgf·cm/cm to about 26 kgf·cm/cm, as measured on an injection-molded ⅛" thick specimen in accordance with ASTM D256.

In exemplary embodiments, the thermoplastic resin composition may include a rubber-modified vinyl-based copolymer resin as the thermoplastic resin and may have an Izod impact strength of about 15 kgf·cm/cm to about 30 kgf·cm/cm, for example, about 15.5 kgf·cm/cm to about 26 kgf·cm/cm, as measured on an injection-molded ⅛" thick specimen in accordance with ASTM D256.

In exemplary embodiments, the thermoplastic resin composition may include a polyolefin resin as the thermoplastic resin and may have an Izod impact strength of about 4 kgf·cm/cm to about 10 kgf·cm/cm, for example, about 4.2 kgf·cm/cm to about 7 kgf·cm/cm, as measured on an injection-molded ⅛" thick specimen in accordance with ASTM D256.

In exemplary embodiments, the thermoplastic resin composition may include an aromatic vinyl resin as the thermoplastic resin and may have an Izod impact strength of about 7 kgf·cm/cm to about 15 kgf·cm/cm, for example, about 7.1 kgf·cm/cm to about 13 kgf·cm/cm, as measured on an injection-molded ⅛" thick specimen in accordance with ASTM D256.

Exemplary embodiments also relate to a molded article formed of the thermoplastic resin composition as set forth above. The thermoplastic resin composition may be prepared in pellet form. The prepared pellets may be formed into a molded article (product) by various molding methods such as injection molding, extrusion, vacuum molding, and casting. Such molding methods are well known to those skilled in the art. The molded article can exhibit good properties in terms of deodorization, impact resistance, flowability (moldability), and balance therebetween, and thus may be applied to exterior materials and the like, which are frequently brought into contact with the human body.

Next, the present invention will be described in more detail with reference to the following examples. It should be understood that these examples are provided for illustration only and are not to be construed in any way as limiting the present invention.

EXAMPLE

Details of components used in Examples and Comparative Examples are as follows:

(A) Thermoplastic resin (A1) Rubber-modified vinyl-based copolymer resin

A rubber-modified vinyl-based copolymer resin including 27 wt % of the rubber-modified vinyl graft copolymer (A1-1) and 73 wt % of the aromatic vinyl copolymer resin (A1-2)

(A1-1) Rubber-modified vinyl graft copolymer

A g-ABS resin prepared by grafting 55 wt % of styrene and acrylonitrile (weight ratio: 75/25) to 45 wt % of polybutadiene rubber (PBR) particles having a Z-average particle diameter of 310 nm (A1-2) Aromatic vinyl copolymer resin A SAN resin (weight average molecular weight: 130,000 g/mol) prepared by polymerization of 68 wt % styrene and 32 wt % acrylonitrile (A2) Polyolefin resin A polypropylene resin having a weight average molecular weight of 248,600 g/mol (Manufacturer: Lotte Chemical Co., Ltd.)

(A3) Aromatic vinyl resin

A high flowability HIPS having a weight average molecular weight of 160,000 g/mol (H-834, Dongbu Chemical Co., Ltd.)

(B) Zinc oxide (B1) Zinc oxide prepared by melting zinc particles in a reactor, heating the molten zinc to 900° C. to vaporize the molten zinc, injecting oxygen gas into the reactor, and cooling the reactor to room temperature (25° C.) to form an intermediate material, followed by heat treatment of the intermediate material at 750° C. for 150 minutes while injecting nitrogen/hydrogen gas into the reactor, and cooling the heat-treated material to room temperature (25° C.)

(B2) Zinc oxide prepared by melting zinc particles in a reactor, heating the molten zinc to 900° C. to vaporize the molten zinc, injecting oxygen gas into the reactor, and cooling the reactor to room temperature (25° C.) to form an intermediate material, followed by heat treatment of the intermediate material at 750° C. for 90 minutes while injecting nitrogen/hydrogen gas into the reactor, and cooling the heat-treated material to room temperature (25° C.)

(B3) Zinc oxide prepared by melting zinc particles in a reactor, heating the molten zinc to 900° C. to vaporize the molten zinc, injecting oxygen gas into the reactor, and cooling the reactor to room temperature (25° C.) to form an intermediate material, followed by heat treatment of the intermediate material at 750° C. for 30 minutes while injecting nitrogen/hydrogen gas into the reactor, and cooling the heat-treated material to room temperature (25° C.)

(B4) Zinc oxide prepared by melting zinc particles in a reactor, heating the molten zinc to 900° C. to vaporize the molten zinc, injecting oxygen gas into the reactor, and cooling the reactor to room temperature (25° C.) to form an intermediate material, followed by heat treatment of the intermediate material at 700° C. for 90 minutes while injecting nitrogen/hydrogen gas into the reactor, and cooling the heat-treated material to room temperature (25° C.)

(B5) Zinc oxide (RZ-950, Ristecbiz Co., Ltd.)

(B6) Zinc oxide (Wako 1st grade, Wako Pure Chemical Industries Ltd,)

For each of the zinc oxides B1, B2, B3, B4, B5, B6, an average particle diameter, BET surface area, purity, a peak intensity ratio (B/A) of peak A in the wavelength range of 370 nm to 390 nm to peak B in the wavelength range of 450 nm to 600 nm in photoluminescence (PL) measurement, photocatalytic efficiency, and crystallite size are measured, and measurement results are shown in Table 1.

TABLE 1

|  | (B1) | (B2) | (B3) | (B4) | (B5) | (B6) |
| --- | --- | --- | --- | --- | --- | --- |
| Average particle diameter (μm) | 1.3 | 1.3 | 1.2 | 1.2 | 1.1 | 1.3 |
| BET surface area (m²/g) | 6 | 6.2 | 6.3 | 4 | 15 | 4.9 |
| Purity (%) | 99.3 | 99.2 | 99 | 99 | 97 | 99 |
| PL peak intensity ratio (B/A) | 0.01 | 0.04 | 0.09 | 0.28 | 9.8 | 0.002 |
| Photocatalytic efficiency (%) | 98.4 | 95.7 | 91.1 | 87.8 | 37.3 | 88.6 |
| Crystallite size (Å) | 1380 | 1466 | 1315 | 1417 | 503 | 1870 |

Property Evaluation (1) Average particle diameter (unit: μm): Average particle diameter (volume average) is measured using a particle analyzer (Laser Diffraction Particle Size Analyzer LS I3 320, Beckman Coulter Co., Ltd.).

(2) BET surface area (unit: m²/g): BET surface area is measured by a nitrogen gas adsorption method using a BET analyzer (Surface Area and Porosity Analyzer ASAP 2020, Micromeritics Co., Ltd.).

(3) Purity (unit: %): Purity is measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm is detected by a CCD detector in a photoluminescence measurement method, in which the CCD detector is maintained at −70° C. A peak intensity ratio (B/A) of peak A in the wavelength range of 370 nm to 390 nm to peak B in the wavelength range of 450 nm to 600 nm is measured. Here, an injection molded specimen is irradiated with laser beams without separate treatment upon PL analysis, and zinc oxide powder is compressed in a pelletizer having a diameter of 6 mm to prepare a flat specimen.

(5) Photocatalytic efficiency (unit: %): For each of the zinc oxides B1, B2, B3, B4, B5, photocatalytic efficiency is calculated according to Equation 1:

$$\text{Photocatalytic efficiency (\%)} = \frac{N1 - N2}{N1} \times 100$$

where N1 denotes a UV absorbance of a 5 ppm methylene blue solution at a wavelength of 660 nm, and N2 denotes a UV absorbance of a 5 ppm methylene blue solution at a wavelength of 660 nm, as measured after 1,000 ppm of the zinc oxide is deposited in the methylene blue solution, followed by irradiation with UV-B in the wavelength range of 280 nm to 360 nm for 2 hours. Before measurement of the UV absorbance, impurities are removed using a PVDF filter (pore size: 0.45 μm).

(6) Crystallite size (unit: Å): Crystallite size is measured using a high-resolution X-ray diffractometer (PRO-MRD, X'pert Inc.) at a peak position degree (2θ) in the range of 35° to 37° and calculated by Scherrer's Equation (Equation 2) with reference to a measured FWHM value (full width at half maximum of a diffraction peak). Here, both a powder form and an injection molded specimen could be measured. For more accurate analysis, the injection molded specimen is subjected to heat treatment at 600° C. in air for 2 hours to remove a polymer resin therefrom before XRD analysis.

$$\text{Crystallite size } (D) = \frac{K\lambda}{\beta \cos\theta} \quad \langle \text{Equation 1} \rangle$$

where K is a shape factor, λ is an X-ray wavelength, β is an FWHM value (degree) of an X-ray diffraction peak, and θ is a peak position degree.

Examples 1 to 27 and Comparative Examples 1 to 27

The aforementioned components are mixed in amounts as listed in Tables 2 to 7, followed by melt extrusion at 230° C., thereby preparing a thermoplastic resin composition in pellet form. Extrusion is performed using a twin-screw extruder (L/D=36, φ45 mm). The prepared pellets are dried at 80° C. for 4 hours or more, followed by injection molding using a 6 oz. injection molding machine (molding temperature: 230° C., mold temperature: 60° C.), thereby preparing a specimen. The prepared specimen is evaluated as to the following properties, and results are shown in Tables 2 to 7.

Evaluation Method (1) Deodorizing properties (unit: μgC/g): Total carbon emission ($E_G$) is measured on a 2 g specimen in accordance with Volkswagen PV 3341 Non-Metallic Materials in Automotive Interior Trim (determination of emission of organic compounds) under the following conditions.

Measurement conditions

| Parameters | | conditions |
|---|---|---|
| HSS | Headspace Sampler | Agilent Technologies G1888 |
| | Method | collecting temp. 120° C., capture time 300 min |
| GC | Column | carbowax 20M (ID 0.32 mm, L 25 m, film thickness 0.30 μm) |
| | Mobile phase | He |
| | Pressure | 7.8 psi |
| | Flow | 2.0 ml/min (Average velocity = 32 cm/sec) |
| | Split | Split ratio = 10:1 |
| | Method | 40° C. 3 min → 200° C. 4 min (R = 12° C./min) |
| | Detector | FID |

(2) Residual total volatile matter (RTVM) (unit: ppm): The content of residual volatile compounds (acrylonitrile (AN) and styrene (SM)) in the thermoplastic resin composition is measured using a gas chromatograph (GC) (HP-6890, Agilent Technologies) under the following conditions:

Reagent: NMP (N-methyl-pyrrolidone) and dioxane

Measurement conditions

| Parameter | Conditions |
|---|---|
| Column | INNOWAX (length 30 m, ID 0.53 mm, film thickness 0.88 μm) |
| Temp. Prog. | 40° C. (4 min) → 20° C./min → 250° C. (4 min) |
| flow rate | 10 mL/min (Headpressure 6.57 Pa) |
| Injector | S/SL Injector |
| Split ratio | 5:1 |
| Detector | FID |
| Injection Vol. | 1 μl |
| Injector temp. | 150° C. |

(3) Izod impact strength (unit: kgf·cm/cm): Izod impact strength is measured on a ⅛" thick injection molded specimen in accordance with ASTM D256.

TABLE 2

| | Example | | | | | | | | |
|---|---|---|---|---|---|---|---|---|---|
| | 1 | 2 | 3 | 4 | 5 | 6 | 7 | 8 | 9 |
| (A1) (parts by weight) | 100 | 100 | 100 | 100 | 100 | 100 | 100 | 100 | 100 |
| (B1) (parts by weight) | 2 | 10 | 25 | — | — | — | — | — | — |
| (B2) (parts by weight) | — | — | — | 2 | 10 | 25 | — | — | — |
| (B3) (parts by weight) | — | — | — | — | — | — | 2 | 10 | 25 |
| Total carbon emission (μgC/g) | 32 | 29 | 22 | 36 | 30 | 24 | 38 | 33 | 29 |
| RTVM (ppm) AN | 66 | 60 | 52 | 69 | 61 | 52 | 69 | 65 | 56 |
| RTVM (ppm) SM | 590 | 572 | 481 | 606 | 580 | 490 | 618 | 585 | 505 |
| IZOD impact strength (kgf·cm/cm) | 25.2 | 20.4 | 16.2 | 24.8 | 20.2 | 15.7 | 24.5 | 20.6 | 16.1 |

TABLE 3

| | Example | | | | | | | | |
|---|---|---|---|---|---|---|---|---|---|
| | 10 | 11 | 12 | 13 | 14 | 15 | 16 | 17 | 18 |
| (A2) (parts by weight) | 100 | 100 | 100 | 100 | 100 | 100 | 100 | 100 | 100 |
| (B1) (parts by weight) | 2 | 10 | 25 | — | — | — | — | — | — |
| (B2) (parts by weight) | — | — | — | 2 | 10 | 25 | — | — | — |
| (B3) (parts by weight) | — | — | — | — | — | — | 2 | 10 | 25 |
| Total carbon emission (μgC/g) | 28 | 25 | 22 | 31 | 29 | 26 | 34 | 29 | 28 |
| IZOD impact strength (kgf·cm/cm) | 6.8 | 5.9 | 4.6 | 6.5 | 5.6 | 4.4 | 6.5 | 5.5 | 4.2 |

TABLE 4

| | Example | | | | | | | | |
|---|---|---|---|---|---|---|---|---|---|
| | 19 | 20 | 21 | 22 | 23 | 24 | 25 | 26 | 27 |
| (A3) (parts by weight) | 100 | 100 | 100 | 100 | 100 | 100 | 100 | 100 | 100 |
| (B1) (parts by weight) | 2 | 10 | 25 | — | — | — | — | — | — |
| (B2) (parts by weight) | — | — | — | 2 | 10 | 25 | — | — | — |
| (B3) (parts by weight) | — | — | — | — | — | — | 2 | 10 | 25 |
| Total carbon emission (μgC/g) | 31 | 25 | 22 | 37 | 31 | 28 | 38 | 35 | 30 |
| RTVM SM (ppm) | 362 | 349 | 311 | 395 | 370 | 344 | 402 | 388 | 361 |
| IZOD impact strength (kgf·cm/cm) | 12.5 | 10.5 | 7.4 | 12.5 | 10.2 | 7.1 | 12.3 | 10.2 | 7.2 |

TABLE 5

| | Comparative Example | | | | | | | | |
|---|---|---|---|---|---|---|---|---|---|
| | 1 | 2 | 3 | 4 | 5 | 6 | 7 | 8 | 9 |
| (A1) (parts by weight) | 100 | 100 | 100 | 100 | 100 | 100 | 100 | 100 | 100 |
| (B1) (parts by weight) | 0.1 | 31 | — | — | — | — | — | — | — |
| (B2) (parts by weight) | — | — | 0.1 | 31 | — | — | — | — | — |
| (B3) (parts by weight) | — | — | — | — | 0.1 | 31 | — | — | — |
| (B4) (parts by weight) | — | — | — | — | — | — | 10 | — | — |
| (B5) (parts by weight) | — | — | — | — | — | — | — | 10 | — |
| (B6) (parts by weight) | — | — | — | — | — | — | — | — | 10 |
| Total carbon emission (μgC/g) | 47 | 20 | 49 | 22 | 55 | 27 | 44 | 48 | 43 |
| RTVM AN (ppm) | 80 | 48 | 85 | 50 | 86 | 55 | 71 | 78 | 73 |
| RTVM SM (ppm) | 742 | 421 | 721 | 460 | 760 | 483 | 638 | 659 | 610 |
| IZOD impact strength (kgf·cm/cm) | 25.8 | 12.9 | 25.2 | 12.5 | 25 | 12.2 | 20.1 | 19.5 | 18.6 |

TABLE 6

| | Comparative Example | | | | | | | | |
|---|---|---|---|---|---|---|---|---|---|
| | 10 | 11 | 12 | 13 | 14 | 15 | 16 | 17 | 18 |
| (A2) (parts by weight) | 100 | 100 | 100 | 100 | 100 | 100 | 100 | 100 | 100 |
| (B1) (parts by weight) | 0.1 | 31 | — | — | — | — | — | — | — |
| (B2) (parts by weight) | — | — | 0.1 | 31 | — | — | — | — | — |
| (B3) (parts by weight) | — | — | — | — | 0.1 | 31 | — | — | — |
| (B4) (parts by weight) | — | — | — | — | — | — | 10 | — | — |
| (B5) (parts by weight) | — | — | — | — | — | — | — | 10 | — |
| (B6) (parts by weight) | — | — | — | — | — | — | — | — | 10 |
| Total carbon emission (μgC/g) | 43 | 20 | 46 | 22 | 47 | 26 | 41 | 43 | 42 |
| IZOD impact strength (kgf·cm/cm) | 7.0 | 3.5 | 6.8 | 3.2 | 6.7 | 3.2 | 5.5 | 5.1 | 4.8 |

TABLE 7

| | Comparative Example | | | | | | | | |
|---|---|---|---|---|---|---|---|---|---|
| | 19 | 20 | 21 | 22 | 23 | 24 | 25 | 26 | 27 |
| (A3) (parts by weight) | 100 | 100 | 100 | 100 | 100 | 100 | 100 | 100 | 100 |
| (B1) (parts by weight) | 0.1 | 31 | — | — | — | — | — | — | — |
| (B2) (parts by weight) | — | — | 0.1 | 31 | — | — | — | — | — |
| (B3) (parts by weight) | — | — | — | — | 0.1 | 31 | — | — | — |
| (B4) (parts by weight) | — | — | — | — | — | — | 10 | — | — |
| (B5) (parts by weight) | — | — | — | — | — | — | — | 10 | — |
| (B6) (parts by weight) | — | — | — | — | — | — | — | — | 10 |
| Total carbon emission (μgC/g) | 41 | 18 | 42 | 20 | 45 | 28 | 42 | 45 | 42 |
| RTVM SM (ppm) | 421 | 301 | 426 | 320 | 431 | 338 | 447 | 464 | 408 |
| IZOD impact strength (kgf·cm/cm) | 12.7 | 5.8 | 12.5 | 5.6 | 12.3 | 5.2 | 10.3 | 9.6 | 9.0 |

From Tables 2 to 7, it can be seen that the thermoplastic resin compositions of the Examples exhibit good properties in terms of deodorizing properties (total carbon emission and residual total volatile matter), impact resistance (Izod impact strength), and the like.

Conversely, it can be seen that the thermoplastic resin compositions (Comparative Example 1, 3, 5, 10, 12, 14, 19, 21, 23) in which zinc oxide is present in an amount of less than 0.5 parts by weight (in an amount of 0.1 parts by weight) relative to 100 parts by weight of the thermoplastic resin exhibit poor deodorizing properties, and the thermoplastic resin compositions (Comparative Examples 2, 4, 6, 11, 13, 15, 20, 22, 24) in which zinc oxide is present in an amount of more than 30 parts by weight relative to 100 parts by weight of the thermoplastic resin exhibit poor impact resistance. In addition, it can be seen that the thermoplastic resin compositions (Comparative Examples 7, 8, 9, 16, 17, 18, 25, 26, 27) using zinc oxides (B4, B5, B6) having PL peak intensity ratios (B/A) outside the range according to the present invention have poor properties in terms of deodorization and/or impact resistance.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a thermoplastic resin; and
   about 0.5 parts by weight to about 30 parts by weight of zinc oxide, the zinc oxide having a peak intensity ratio (B/A) of about 0.01 to less than about 0.1, where A indicates intensity of the peak in the wavelength range of 370 nm to 390 nm and B indicates intensity of the peak in the wavelength range of 450 nm to 600 nm in photoluminescence measurement,
   wherein the zinc oxide has a photocatalytic efficiency of about 90% to about 99%, as calculated by Equation 1:

$$\text{Photocatalytic efficiency (\%)} = \frac{N1 - N2}{N1} \times 100$$

where N1 denotes a UV absorbance of a 5 ppm methylene blue solution at a wavelength of 660 nm, and N2 denotes a UV absorbance of a 5 ppm methylene blue solution at a wavelength of 660 nm, as measured after 1,000 ppm of the zinc oxide is deposited in the methylene blue solution, followed by irradiation with UV-B in the wavelength range of 280 nm to 360 nm for 2 hours.

2. The thermoplastic resin composition according to claim 1, wherein the zinc oxide has a peak position degree (2θ) in the range of about 35° to about 37° and a crystallite size of about 1,000 Å to about 2,000 Å in analysis of X-ray diffraction (XRD), as calculated by Equation 2:

$$\text{Crystallite size } (D) = \frac{K\lambda}{\beta \cos\theta}$$

where K is a shape factor, λ is an X-ray wavelength, β is an FWHM value (degree) of an X-ray diffraction peak, and θ is a peak position degree.

3. The thermoplastic resin composition according to claim 1, wherein the zinc oxide has a peak intensity ratio (B/A) of about 0.01 to less than about 0.07 in photoluminescence measurement.

4. The thermoplastic resin composition according to claim 1, wherein the zinc oxide has an average particle diameter (D50) of about 0.5 μm to about 3 μm, as measured by a particle analyzer.

5. The thermoplastic resin composition according to claim 1, wherein the zinc oxide has an average particle diameter (D50) of about 1 μm to about 3 μm, as measured by a particle analyzer.

6. The thermoplastic resin composition according to claim 1, wherein the zinc oxide has a BET specific surface area of about 10 m²/g or less, as measured by a nitrogen gas adsorption method using a BET analyzer.

7. The thermoplastic resin composition according to claim 1, wherein the zinc oxide has a BET specific surface area of about 1 m²/g to about 7 m²/g, as measured by a nitrogen gas adsorption method using a BET analyzer.

8. The thermoplastic resin composition according to claim 1, wherein the zinc oxide is prepared by melting zinc particles in a reactor, heating the molten zinc to about 850° C. to about 1,000° C. to vaporize the molten zinc, injecting oxygen gas into the reactor, cooling the reactor to about 20° C. to about 30° C., heating the reactor to about 700° C. to about 800° C. for about 30 to 150 minutes while injecting nitrogen/hydrogen gas into the reactor, and cooling the reactor to about 20° C. to about 30° C.

9. The thermoplastic resin composition according to claim 1, wherein the thermoplastic resin comprises at least one of a rubber-modified vinyl-based copolymer resin, an aromatic vinyl resin, a polyolefin resin, a polycarbonate resin, a poly(alkyl (meth)acrylate) resin, a polyester resin, and a polyamide resin.

10. The thermoplastic resin composition according to claim 9, wherein the rubber-modified vinyl-based copolymer resin comprises a rubber-modified vinyl graft copolymer and an aromatic vinyl copolymer resin.

11. The thermoplastic resin composition according to claim 10, wherein the rubber-modified vinyl graft copolymer is prepared by graft polymerization of an aromatic vinyl monomer and a monomer copolymerizable with the aromatic vinyl monomer to a rubber polymer.

12. The thermoplastic resin composition according to claim 10, wherein the aromatic vinyl copolymer resin is a copolymer of an aromatic vinyl monomer and a monomer copolymerizable with the aromatic vinyl monomer.

13. The thermoplastic resin composition according to claim 1, wherein the thermoplastic resin is a rubber-modified vinyl-based copolymer resin, a polyolefin resin, and/or an aromatic vinyl resin.

14. The thermoplastic resin composition according to claim 1, wherein the thermoplastic resin composition has a total carbon emission ($E_G$) of about 20 μgC/g to about 40 μgC/g, as measured on a 2 g specimen in accordance with PV 3341 (Determination of emission of organic compounds).

15. The thermoplastic resin composition according to claim 1, wherein the thermoplastic resin composition has an Izod impact strength of about 4 kgf·cm/cm to about 30 kgf·cm/cm, as measured on an injection-molded ⅛" thick specimen in accordance with ASTM D256.

16. The thermoplastic resin composition according to claim 1, wherein the thermoplastic resin is a rubber-modified vinyl-based copolymer resin, and the thermoplastic resin composition has an Izod impact strength of about 15 kgf·cm/cm to about 30 kgf·cm/cm, as measured on an injection-molded ⅛" thick specimen in accordance with ASTM D256.

17. The thermoplastic resin composition according to claim 1, wherein the thermoplastic resin is a polyolefin resin and the thermoplastic resin composition has an Izod impact strength of about 4 kgf·cm/cm to about 10 kgf·cm/cm, as measured on an injection-molded ⅛" thick specimen in accordance with ASTM D256.

18. The thermoplastic resin composition according to claim 1, wherein the thermoplastic resin is an aromatic vinyl resin and the thermoplastic resin composition has an Izod impact strength of about 7 kgf·cm/cm to about 15 kgf·cm/cm, as measured on an injection-molded ⅛" thick specimen in accordance with ASTM D256.

19. A molded article formed of the thermoplastic resin composition according to claim 1.

* * * * *